(12) United States Patent
Saugnac

(10) Patent No.: US 8,856,277 B2
(45) Date of Patent: Oct. 7, 2014

(54) SYSTEM ENABLING COMMUNICATION BETWEEN AN AIRCRAFT-BASED COMPUTER NETWORK AND A GROUND-BASED COMPUTER NETWORK

(75) Inventor: Frederic Saugnac, Auzeville Tolosane (FR)

(73) Assignee: Airbus, Blagnac (FR)

( * ) Notice: Subject to any disclaimer, the term of this patent is extended or adjusted under 35 U.S.C. 154(b) by 0 days.

(21) Appl. No.: 12/594,515

(22) PCT Filed: Apr. 4, 2008

(86) PCT No.: PCT/FR2008/000475
§ 371 (c)(1),
(2), (4) Date: Jan. 15, 2010

(87) PCT Pub. No.: WO2008/139060
PCT Pub. Date: Nov. 20, 2008

(65) Prior Publication Data
US 2010/0121938 A1  May 13, 2010

(30) Foreign Application Priority Data
Apr. 6, 2007 (FR) .................................. 07 54396

(51) Int. Cl.
G06F 15/16 (2006.01)
H04M 3/22 (2006.01)
H04L 12/58 (2006.01)
G06F 9/44 (2006.01)
H04M 7/00 (2006.01)
H04M 3/24 (2006.01)

(52) U.S. Cl.
CPC ............. *H04M 3/22* (2013.01); *H04L 12/5875* (2013.01); *G06F 8/70* (2013.01); *H04M 7/0081* (2013.01); *H04M 3/247* (2013.01)

USPC ............... 709/218; 701/1; 719/328; 370/401; 370/463; 340/945

(58) Field of Classification Search
CPC ..... H04M 3/22; H04M 3/247; H04M 7/0081; H04N 1/00347
USPC ........................................................ 709/218
See application file for complete search history.

(56) References Cited

U.S. PATENT DOCUMENTS 4,924,456 A * 5/1990 Maxwell et al. ............... 370/296
5,826,198 A * 10/1998 Bergins et al. ................. 455/557

(Continued)

FOREIGN PATENT DOCUMENTS

CN    1914829 A      2/2007
EP    1 316 908 A1   6/2003

(Continued)

OTHER PUBLICATIONS

IP.com search results.*

(Continued)

*Primary Examiner* — Arvin Eskandarnia
(74) *Attorney, Agent, or Firm* — Oblon, Spivak, McClelland, Maier & Neustadt, L.L.P.

(57) ABSTRACT

A system enabling communication between an aircraft-based computer network and a ground-based computer network. The system establishes a network communication between a ground-based computer network and an aircraft-based computer network via at least one communication medium using a synchronous communication mode. The system can be used to simplify procedures involved in maintaining a fleet of aircraft connected to a maintenance control center (MCC) and, in particular, to facilitate and secure the updating of aircraft logbooks (e.g., a cabin logbook and technical logbook).

20 Claims, 7 Drawing Sheets

(56) References Cited

U.S. PATENT DOCUMENTS

| | | | |
|---|---|---|---|
| 5,935,267 A * | 8/1999 | Hayakawa | 714/748 |
| 6,115,656 A * | 9/2000 | Sudolsky | 701/33.4 |
| 7,907,545 B2 * | 3/2011 | Ric | 370/254 |
| 8,401,729 B2 * | 3/2013 | Rouyre | 701/29.3 |
| 2002/0058478 A1 * | 5/2002 | de La Chapelle et al. | 455/13.4 |
| 2003/0003872 A1 | 1/2003 | Brinkley et al. | |
| 2003/0186706 A1 * | 10/2003 | Bergins et al. | 455/452.2 |
| 2004/0039499 A1 * | 2/2004 | Felke et al. | 701/29 |
| 2004/0167967 A1 | 8/2004 | Bastian et al. | |
| 2004/0198498 A1 * | 10/2004 | Yamashita et al. | 463/43 |
| 2005/0026609 A1 | 2/2005 | Brinkley et al. | |
| 2005/0256616 A1 | 11/2005 | Rhoads | |
| 2006/0052921 A1 | 3/2006 | Bodin et al. | |
| 2006/0179457 A1 * | 8/2006 | Brady et al. | 725/76 |
| 2007/0010236 A1 | 1/2007 | Allen et al. | |
| 2007/0183435 A1 * | 8/2007 | Kettering et al. | 370/401 |

FOREIGN PATENT DOCUMENTS

| | | |
|---|---|---|
| EP | 1 592 203 A1 | 11/2005 |
| JP | 2003-271758 | 9/2003 |
| JP | 2005-327278 | 11/2005 |
| WO | 2005/060509 A2 | 7/2005 |
| WO | 2007 117285 | 10/2007 |

OTHER PUBLICATIONS

Google Scholar search results.*

Google Patents search results.*

Chinese Office Action issued Apr. 24, 2012 in Chinese Patent Application No. 200880014899.5 with English translation.

Japanese Office Action issued Sep. 4, 2012. in Patent Application No. 2010-501553 (English-language translation only).

* cited by examiner

SYSTEM ENABLING COMMUNICATION BETWEEN AN AIRCRAFT-BASED COMPUTER NETWORK AND A GROUND-BASED COMPUTER NETWORK

This invention relates to a system for communication between a computer network in an aircraft and a computer network on the ground, an aircraft computer network and a ground computer network.

Nowadays an avionic system comprises a set of on-board tools and databases so as, in particular, to computerize the tools, in particular the tools for diagnosis, for maintenance, and documents, such as the manuals for diagnosis of breakdowns or operating manuals for the airplane. The tools therefore now are used, for example, by software or databases.

Mainly, two types of maintenance can be considered.

First, there is considered the maintenance that takes place in the main maintenance base for the airplane or outside this base, consisting in actions limited to adjustment, safety and the need to have the airplane fly, also called dispatch, without delay or within a limited delay.

Then there is considered the maintenance performed in the main maintenance base for the airplane for which additional maintenance actions are performed, such as the maintenance taking place at regular intervals.

Figure 1:
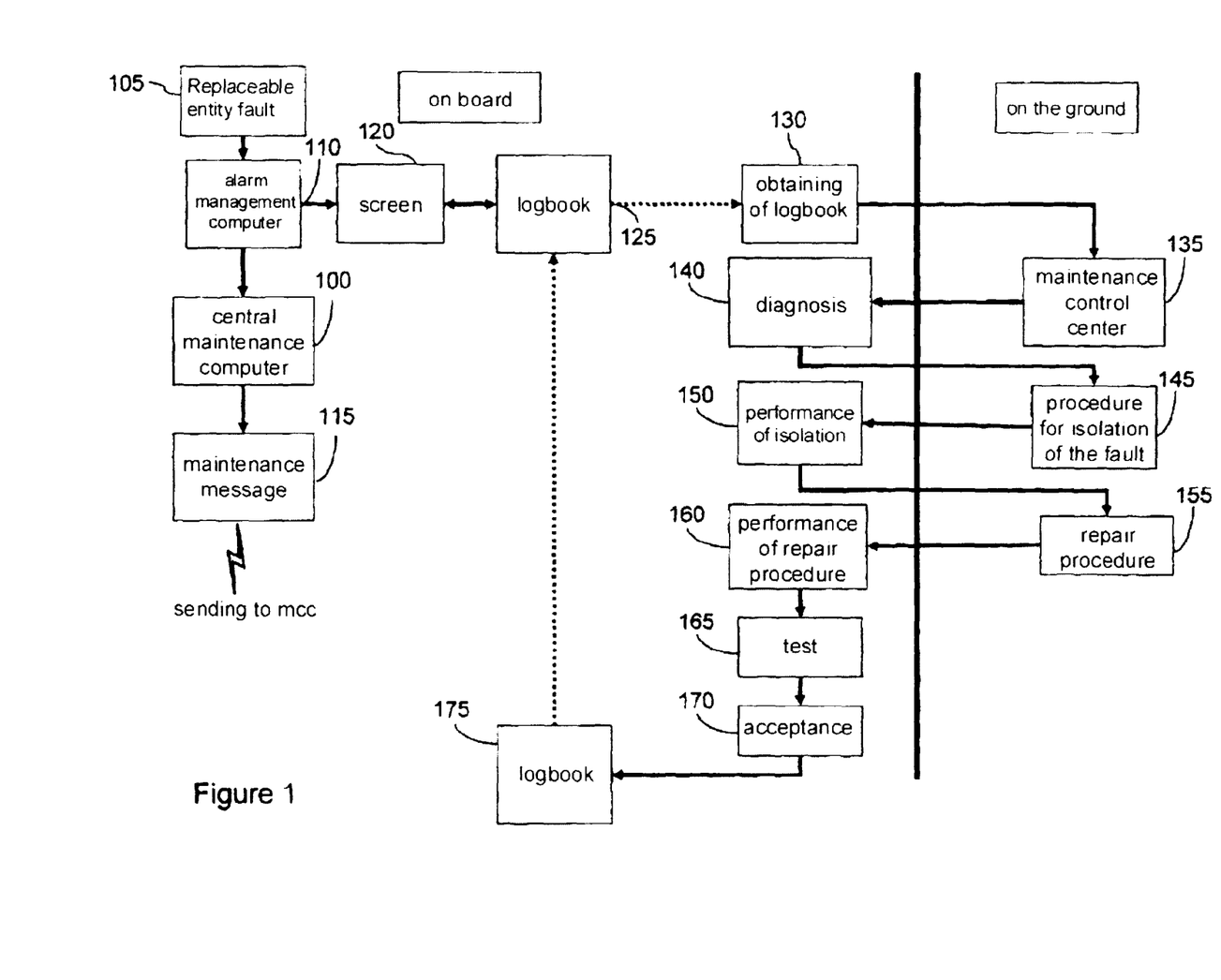
FIG. 1 illustrates maintenance operations performed in the airplane and in the maintenance base on the ground according to the state of the art.

In FIG. 1 there is illustrated a diagram of maintenance operations performed in the airplane and in the maintenance base on the ground according to a known solution.

Maintenance is backed by a system, in particular a central maintenance computer 100 ("Central Maintenance Computer" in English terminology), that collects, consolidates and reports faults in the replaceable entities of the airplane LRU 105 ("Line Replaceable Unit" in English terminology) in order to help the flight crew and the maintenance personnel in the maintenance procedures.

Faults in the replaceable entities of the airplane 105 are the object of alarm management by a computer 110.

The central maintenance computer 100 sends out a maintenance message 115 to the company to which the airplane is attached, in particular to the maintenance control center MCC (acronym for "Maintenance Control Center" in English terminology).

A screen 120 is connected to the alarm management computer 110 in order to display the faults in the replaceable entities of the airplane 105.

The set of faults or events occurring during a service of the airplane is stored in an on-board notebook 125 called "logbook" in English terminology. This logbook linked to the airplane is filled out either by the pilots ("technical logbook" in English terminology) or by the cabin crew ("Cabin Logbook" in English terminology).

To do so, the crew manually enters in the logbook 125 the faults that occurred as well as the flight conditions under which the faults occurred.

When the airplane is on the ground, the logbook is retrieved 130 in the airplane in order to be read on the ground by the maintenance control center MCC 135. Then a maintenance technician goes into the airplane in order to analyze the faults recorded and make a diagnosis 140.

The technician then goes to the maintenance base on the ground in order to obtain the procedure for isolation of the fault 145.

With this procedure, also called TSM (acronym for "Troubleshooting manual" in English terminology), the technician again goes into the airplane in order to carry out this procedure for isolation of faults 150.

At the end of isolation of faults, the technician returns to the base on the ground in order to obtain the repair procedure 155 and if need be to order a replacement part from the spares warehouse.

Then the maintenance technician once again goes back into the airplane to carry out the repair procedure 160.

Then tests 165 are performed in order to check functioning at the end of the repair and an acceptance procedure 170 is carried out, consisting in declaring the airplane as being able to fly.

Finally, this acceptance is entered in the logbook 175.

As will be easily understood upon reading of the foregoing, this maintenance operating mode has a high cost, and grounds the airplane for a considerable time.

Another known solution consists in storing in the storage mediums on board (databases) the set of procedures for isolation of faults and the set of procedures for repair making it possible to do away with the maintenance technician's back-and-forth between the airplane and the maintenance base on the ground.

The set of procedures for isolation of faults and the set of procedures for repair, however, represent a large volume of data, capable of reaching several gigabytes of data.

The set of tools, data and documents furthermore must be regularly updated so that the crew of the airplane, and more particularly the pilot and the maintenance technician, can benefit from the most recent version of the tools and documents.

To do so, the tools and documentation are loaded into the computer or computers of the airplane by a technician in charge of keeping these tools and documents up to date (or synchronizing the on-board databases containing these documents with the databases on the ground). He is equipped, for example, with a portable computer comprising in storage the most recent version of the tools and data, and goes into the airplane in order to perform the loading and updating of the tools and data.

However, given that these tools and the documentation represent a large volume of data, namely several gigabytes, this updating is lengthy and can necessitate grounding the airplane for a relatively long time.

The same is true if the technician uses a portable computer having a Wifi radio connection with which he loads the data and he updates the tools and data stored in the network of the airplane from the data loaded onto his portable computer.

Moreover, an airline company usually has a large fleet of airplanes which translates into a high cost for maintenance of the tools and documents of the airplanes in its fleet as well as an extensive configuration management of the data on the ground intended to be loaded on board the airplanes.

Keeping such a volume up to date thus is made difficult. As a result of that, the maintenance technician, relying on these procedures stored in the airplane, may obtain information items concerning the procedures for isolation and repair to be followed which no longer may be up to date, or even be erroneous. Furthermore, when the data for resolution of problems are on board, that does not avoid the need for the maintenance technician to make contact with the spare parts warehouse.

This invention has as its object to remedy at least one of the drawbacks of the techniques and processes of the aforesaid prior art. To do so, the invention proposes a system for communication between a computer network in an aircraft and a computer network on the ground, making possible in particular the reduction of maintenance costs, the rapid return of the airplane to operation, the updating of the data and tools of the aircraft in a secured manner without necessitating the intervention of a technician.

The invention thus has as its object a system for communication between a computer network in an aircraft and a computer network on the ground, characterized in that it comprises means capable of establishing a network connection between a computer network on the ground and a computer network in the aircraft via at least one communication medium according to a synchronous communication mode.

According to the invention, at least one avionic system is connected in real time and in continuous manner with an infrastructure on the ground. At least one computer tool is shared between the ground infrastructure and the on-board avionic system. This tool gives access to the ground, to on-board and to the network, and makes it possible to perform remote actions between the ground and on-board. It can be used by a single operator set up at a fixed location.

A maintenance operation and a simultaneous updating of the ground and on-board databases can be performed in one go in synchronized and coordinated manner, by virtue of the use of the shared computer tool. The maintenance operation can include a test and a consultation of the airplane documentation.

The system involves a single maintenance operation coordinated in real time between the ground and on-board. It involves a single sequence of operations coordinated in real time between the ground and on-board and makes it possible to identify, to correct and to follow (plot) the actions performed in the databases.

Communication can be carried out by secured IP protocol, for example. Coordination and synchronization of the databases are carried out in real time.

The airplane can be in flight and the operator on the ground can conduct a system test during the flight.

Alternatively, the airplane can be on the ground, the operator on board or on the ground at the maintenance center.

The invention provides a system for communication between a computer network in an aircraft and a computer network on the ground by establishment of a network connection according to a synchronous communication mode in order to create a continuity of the network of the aircraft with the computer network on the ground.

Furthermore, this system allows the updating of data stored in the computer network in the aircraft to the computer network on the ground and vice versa.

Moreover, in accordance with the invention, it is permitted to carry out interactive browsing in the data stored in the infrastructure on the ground as well as in the documentary sites containing the airplane documentation (TSM or other), for example.

There is no need for verification or an operation for synchronization of databases between the ground and on-board. The system offers the possibility of executing operations on the ground from on-board (shared ground/on-board tools), or on board from the ground, by virtue of synchronous communication.

The communication medium is, for example, a mobile telephony network, a wireless communication network, a satellite network and/or a hard-wired link.

According to one characteristic, the system comprises means for updating data stored in the computer network of the aircraft from data stored in the computer network on the ground.

According to another characteristic, the system comprises means for sending out data stored in the aircraft computer network to the computer network on the ground.

According to one embodiment, the computer network in the aircraft and the computer network on the ground are connected by a virtual private network.

This invention also has as its object to provide an aircraft computer network, characterized in that it comprises means capable of establishing a network connection with a computer network on the ground via at least one communication medium according to a synchronous communication mode.

This device has the same advantages as the communication system briefly described above.

This invention also has as its object to provide a computer network on the ground, characterized in that it comprises means capable of establishing a network connection with a computer network of an aircraft via at least one communication medium according to a synchronous communication mode.

This device has the same advantages as the communication system briefly described above.

Other advantages, purposes and characteristics of this invention emerge from the detailed description that follows, given by way of non-limitative example, with reference to the attached drawings in which.

In accordance with the invention, there is installed in the airplane an electronic maintenance system capable of performing maintenance operations in order in particular, to replace the paper process by an electronic process.

This system relies on an on-board infrastructure in an airplane, that is, an avionic system comprising in particular a set of functional entities of the airplane, for example replaceable entities of the airplane, accommodating applications for crew and maintenance, an infrastructure on the ground to prepare, personalize and manage the data to be used on board, for example to perform maintenance operations or to obtain data from the airplane to be used on the ground and a connection infrastructure for exchanging data between the infrastructure on the ground and the on-board infrastructure and for updating the tools and the data stored in the on-board infrastructure.

The infrastructure on the ground is, for example, present in the maintenance base of the airline company to which the airplane is attached.

Figure 2:
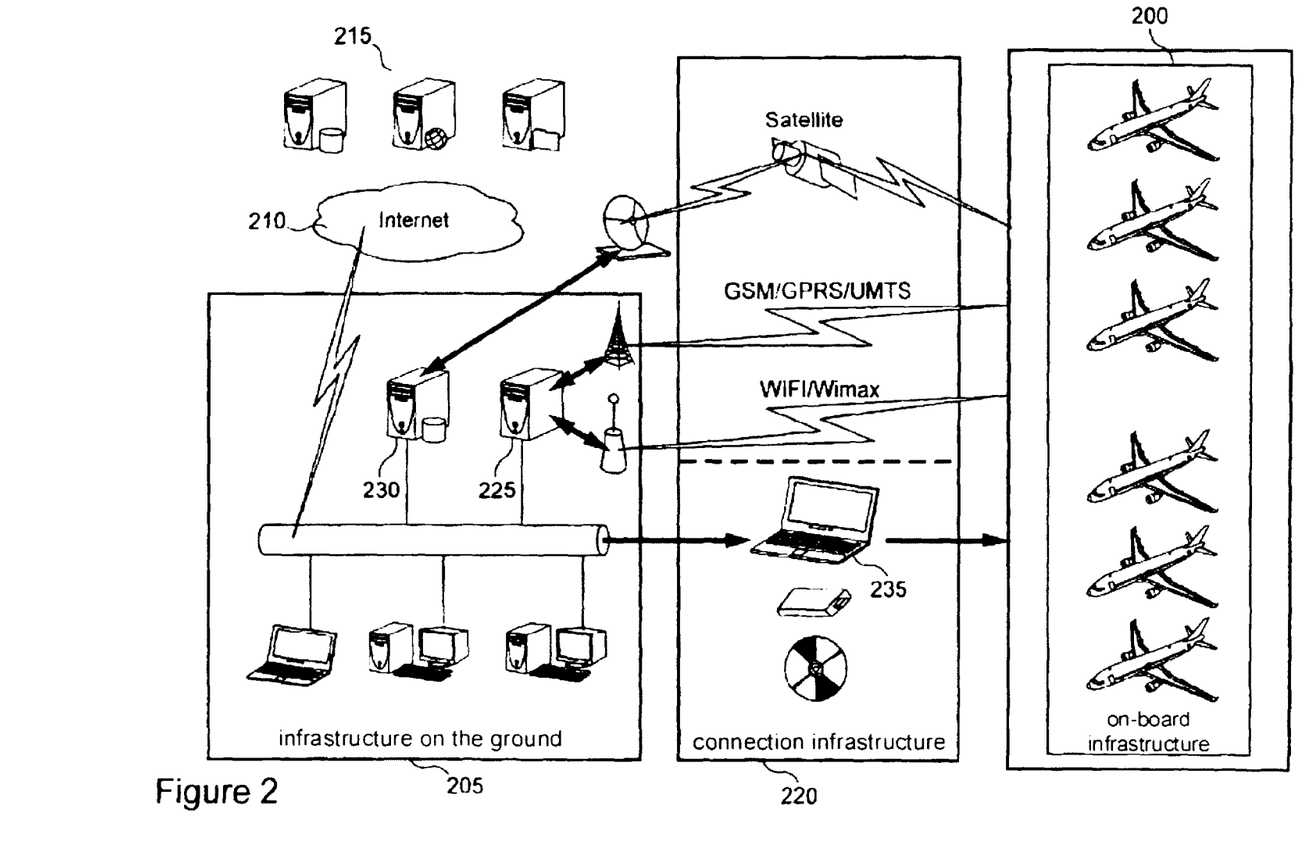
FIG. 2 illustrates an overall view of the system in which the invention is implemented.

FIG. 2 illustrates an overall view of the system used in the invention.

Thus, there is shown a group of airplanes 200 (on-board infrastructures) of an airline company and an infrastructure on the ground 205 of this company. This infrastructure on the ground comprises in particular a set of processing units interconnected via a telecommunication network. This network also comprises a connection 210, for example an Internet connection in order to be connected to the servers of the airplane manufacturers or to any third party 215.

The infrastructure on the ground also is connected via a communication network 220 (connection infrastructure) to the avionic network of the airplanes. The communication network 220 relies, for example, on a wireless communication medium, for example WIFI or Wimax, a mobile telephony communication medium, for example GSM/GPRS or UMTS or a satellite communication medium. Furthermore, the airplane can be connected to the ground by a hard-wired link in case of breakdown in the event of unavailability of the radio communication.

The network of the infrastructure on the ground thus comprises in particular a server 225 capable of sending out data to an airplane and receiving data from an airplane by satellite, and a server 230 capable of sending out data to an airplane and receiving data from an airplane by using a wireless communication or mobile telephony medium.

Furthermore, there may be used a portable medium 235, such as a portable computer, a USB ("Universal Serial Bus" in English terminology) key, a CD/DVD, in order to exchange data with the airplane.

Thus, in accordance with the invention, the infrastructure of the airplane is a mobile network capable of communicating with the infrastructure on the ground of the company of attachment so as to create a continuity between the on-board infrastructure and the infrastructure on the ground.

According to a particular embodiment, the on-board infrastructure communicates with the infrastructure on the ground according to a synchronous communication mode, this type of communication making it possible to do interactive browsing of the documentary sites containing the airplane documentation, for example.

Synchronous communication consists in establishing a link or channel for communication between the avionic system and the infrastructure on the ground, dedicated to communication between them, that is, it is available when, for example, one wishes to consult data in the infrastructure on the ground from the aircraft or one wishes to obtain information items stored in the infrastructure on the ground.

In this way, it is not necessary to establish a communication link or channel each time one wishes to conduct a communication.

Consequently, communication between the aircraft and the infrastructure on the ground is ensured so long as one is not dependent on whether or not a channel is available.

As the infrastructure of the airplane becomes a continuation of the infrastructure on the ground, it is possible to perform updates and maintenance operations in synchronous manner between the ground and on-board.

Moreover, communication can be initiated via the on-board infrastructure or via the infrastructure on the ground.

In accordance with the invention, the communication network 220 connecting the on-board infrastructure of an airplane and the infrastructure on the ground makes it possible no longer to take on board all the tools and software, but only the essential tools, the other data being able to be consulted by connection when that is necessary. In this way, a maintenance technician, in the airplane, can access the data stored in the infrastructure on the ground making it possible to perform maintenance operations, without going back and forth between the airplane and the maintenance base.

Furthermore, the maintenance technician, in the airplane, can perform updates of the tools and the data stored in the infrastructure of the airplane.

Furthermore, the maintenance technician can update the tools and the data in the airplane from the ground, an operation also called remote updating ("remote update" in English terminology). For example, the maintenance technician can update the status of the logbook of the airplane at the end of maintenance.

In the same way, the pilot or the maintenance operator can consult the ground servers in real time in order to have access to all the servers of the company to which the airplane is attached and simultaneously update the on-board data and tools, an operation also called remote operations ("remote operations" in English terminology).

Finally, a technician on the ground can command the performance of tests on the avionic system prior to the performance of maintenance operations by sending out commands via communication network 220. In this way, it is made possible for the maintenance technician, for example, prior to the landing of the airplane, to carry out tests with a view to identifying the replaceable entities of the malfunctioning airplane.

According to a particular embodiment, there is created, on a communication medium between the on-board infrastructure and the infrastructure on the ground, in particular on a wireless network or on a mobile telephony network, an encapsulation, also called tunneling ("tunneling" in English) protocol, capable of encapsulating the data to be transmitted in encoded form. This network created is called a virtual private network (designated as RPV or VPN, acronym for "Virtual Private Network"). This network is referred to as virtual because it connects two physical networks through a not necessarily reliable communication medium, and private because only the computers of the networks of either side of the virtual private network can access the data. Moreover, it makes it possible to secure exchanges on the not necessarily reliable communication medium.

In this way, a secured link at lower cost is created.

Figure 3:
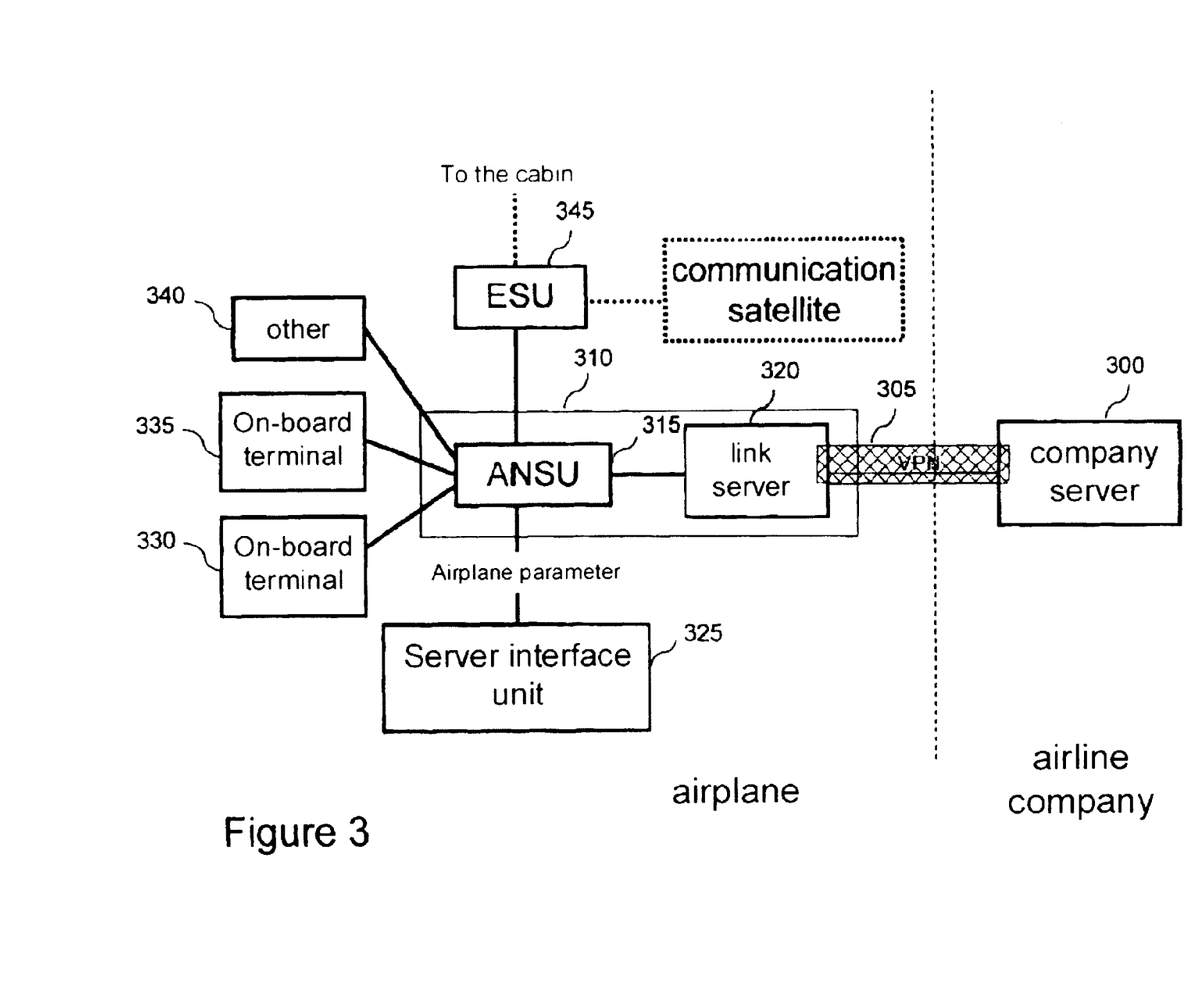
FIG. 3 illustrates a possible implementation in the on-board infrastructure for connection with the infrastructure on the ground according to the invention.

A possible implementation of this system in accordance with the invention is illustrated in FIG. 3.

According to this implementation, a server outside airplane 300, here on the ground, of the airline company, is connected to a link server 320 of the on-board structure of the airplane via a virtual network 305. The airplane server 310 comprises a network server ANSU ("Aircraft Network Server Unit" according to English terminology) 315 also connected to link server 320.

To the server ANSU 315, there are connected in particular a server interface unit 325, different on-board terminals 330, 335, 340 by means of an electronic network routing unit ("Ethernet Switch Unit" according to English terminology) 345.

According to a particular embodiment of the invention, the electronic storage unit is connected to a Satcom-type satellite network, the latter itself being capable of being connected to the server of the airline company.

The link server 320 is capable of being connected via a connection network, for example a virtual private network, to a server 300 of the airline company by using different communication mediums, in particular the mobile telephony network, for example the GSM ("Global System for Mobile Communications" according to English terminology)/EDGE/UMTS ("Universal Mobile Telecommunications System" in English terminology)/HSDPA ("High Speed Downlink Packet Access" in English terminology) network, or a wireless network, for example the WIFI 802.11a/b/g or a satellite network, for example the HSD ("high speed data Satcom" in English terminology) network.

In that way, the computer network of the airplane is connected to the computer network on the ground, of the airline company to which the airplane is attached.

At the time of establishment of a network connection between the computer network of the airplane and the computer network on the ground, a medium is selected from among the plurality of available communication mediums, in particular according to the availability of the communication mediums or the output of the communication mediums.

The servers 300 and 330 then encapsulate and decapsulate the data via coding and encryption mechanisms.

These communication mediums are capable of providing a high output so as to allow the transmission of large masses of data between the infrastructure on the ground and the on-board infrastructure of the airplane in a reasonable time, and in particular to make it possible to load, from the airline company infrastructure on the ground to the airplane computers, the most recent versions of the tools, data and documents, the loading operation being able to be commanded by a technician on board the airplane or by a technician on the ground from the infrastructure on the ground.

Also, it is possible for a maintenance technician on board the airplane to have access to the maintenance data and the central tools for management of the information of the airline company ("maintenance information server" in English terminology or "Flight Ops Information server") stored in the infrastructure on the ground.

Furthermore, this type of connection makes it possible, by virtue of the Internet connections, to reach from the airplane servers connected to the airline company infrastructure on the ground, such as the server of the manufacturer of the airplane or of certain major items of equipment making up the airplane or its cabin.

Furthermore, according to this architecture, it is possible for a maintenance technician on board the airplane to have access to providers in order, for example, to consult flight data or maintenance documentations or to connect with service companies on the ground that support the maintenance operations of the airplane.

By means of such an architecture, the maintenance of an airplane, consisting in putting in working order, maintaining an airplane in good flying condition and repairing an airplane is carried out in the shortest possible time and in optimized manner, since all the tools on the ground for maintenance of the airplane are updated in particular at the moment of the authorization to dispatch the airplane.

Furthermore, in accordance with the invention, electronic maintenance makes it possible to put in working order and maintain an airplane in good flying condition at any moment and irrespective of its location.

To do so, a minimum of information data, such as the diagnosis tool, the electronic logbook, the list of minimum equipment MEL ("Minimum Equipment List" in English terminology), or even a subset of these data is loaded into the airplane.

Then, through the intermediary of the communication network 220, the maintenance technician on board the airplane will access by a connection called remote ("remote access" in English terminology), in particular secured, for example data present in the company infrastructure on the ground, such as the repair manual TSM, the maintenance manual AMM (acronym for "Aircraft Maintenance Manual" in English terminology) or the IPC (acronym for "Identification Part Catalogue" in English terminology) that makes it possible to identify the reference of a part to be replaced and to order it from the spares warehouse.

Figure 4:
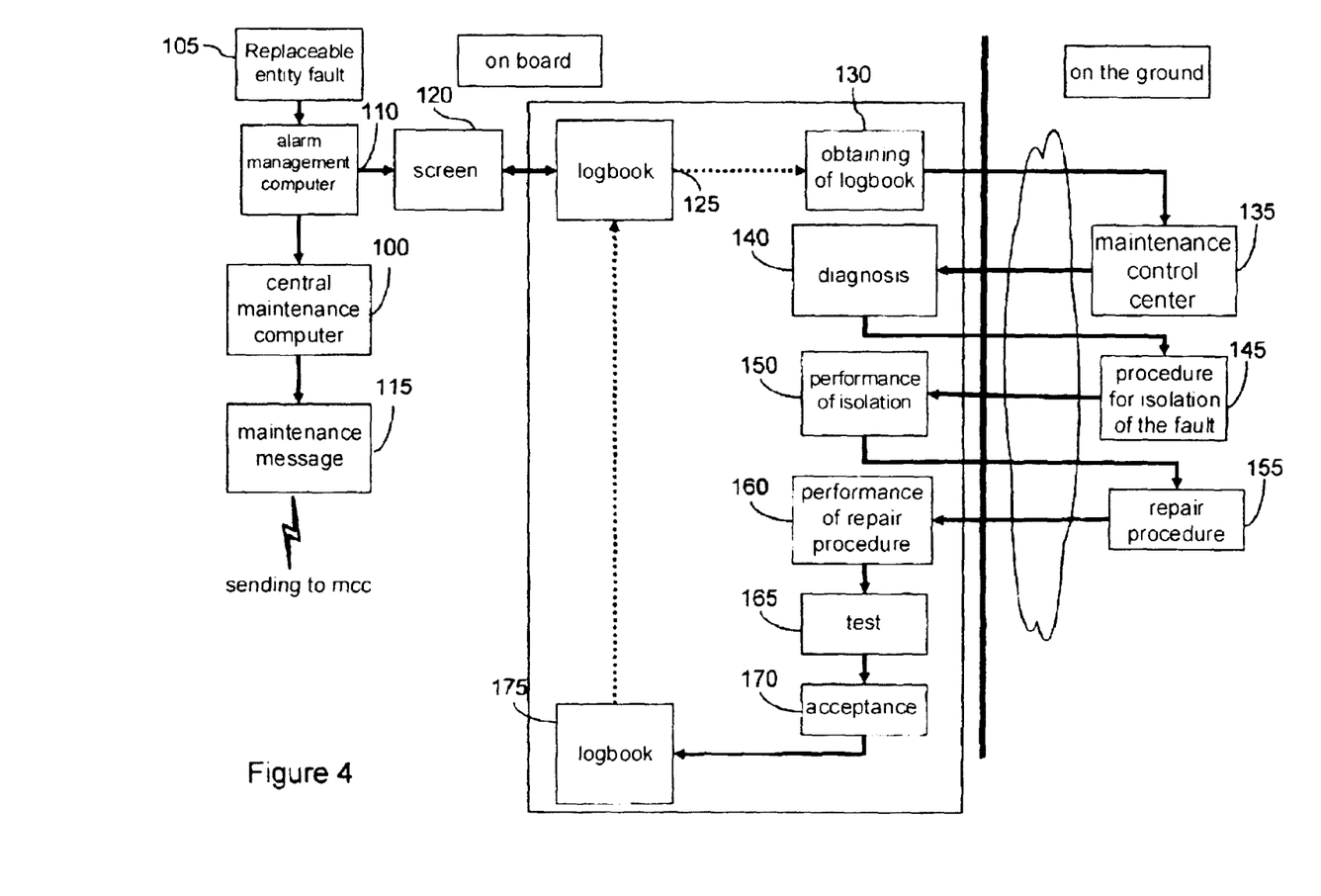
FIG. 4 illustrates maintenance operations performed in the airplane and in the maintenance base of the ground in accordance with the invention.

In that way, the technician has, via the communication network 220, in particular by the use of a VPN-type secured channel, an access to the manuals stored in the infrastructure on the ground, these manuals being the most recent versions, such as illustrated in FIG. 4, in that way limiting the maintenance technician's back-and-forth between the airplane and the maintenance infrastructure on the ground.

In this way, such as illustrated in FIG. 4, where the references already cited on FIG. 1 appear again, the technician on board the airplane, by means of remote commands, in particular consultation commands, will access the procedure for isolation of the diagnosed fault, also called malfunction, 145, as well as the procedure for repair of the isolated fault 155 and if need be the spare parts warehouse, via the communication medium 220.

According to a particular embodiment, this network connection is a synchronous connection.

According to another embodiment, a technician on the ground can, prior to the arrival of the airplane on the ground, send out commands, via the communication network 220, to the on-board infrastructure in order to conduct a certain number of tests so as to diagnose, isolate and repair the faults as quickly as possible.

According to an embodiment, the tools, in particular the diagnosis tools, and the data can be loaded into the on-board infrastructure in the airplane, via the communication network 220, the latter being capable of carrying out exchanges between the on-board infrastructure and the infrastructure on the ground according to a high-output means of communication.

To do so, there can be put in place a communication network 220 capable of communicating between the link server 320 and the company server 300 according to a mobile telephony system and/or according to a wireless communication network, in particular by the use of a secured VPN-type channel.

According to an exemplary scenario, one is informed of a fault in an item of equipment by virtue of the storage of the fault in the logbook (logbook). An operator on the ground is connected to the airplane from the maintenance center (mcc) on the ground.

Since the result of the test concludes that the fault in the item of equipment is, for example, a "spurious message" (extraneous message), the operator can, still from his office, decide that the item of equipment is operational, and issue an "OK" status on board the airplane (updating of the on-board base) at the same time that he updates the ground database.

There is only one ground/on-board tool allowing maintenance of the airplane. It involves a tool that can be used from the airplane or from the maintenance center.

Figure 5:
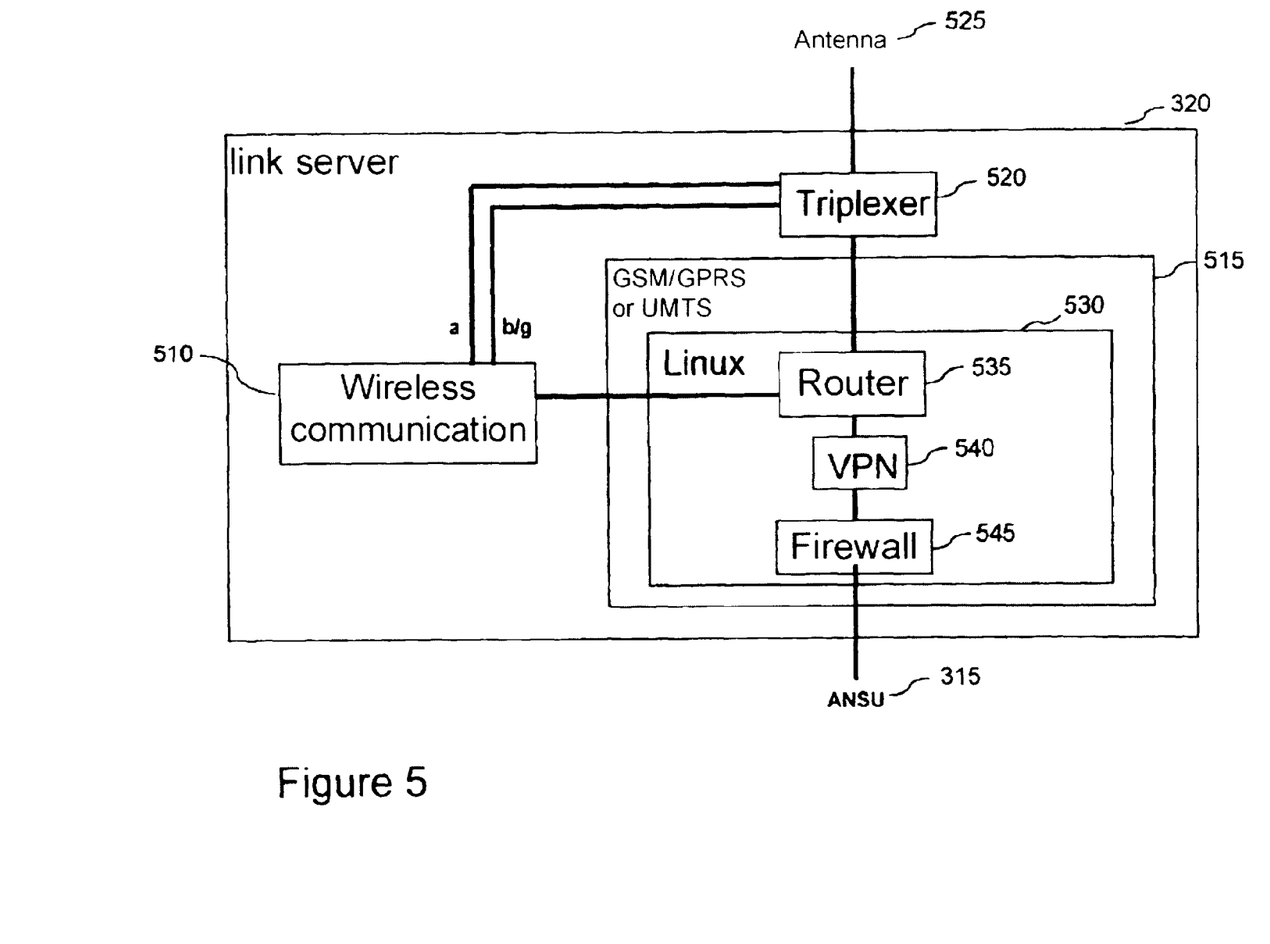
FIG. 5 shows an implementation of a link server in an airplane in accordance with the invention.

There now is illustrated in FIG. 5 an architecture for implementing the link server 320 in the airplane capable of communicating according to a mobile telephony network and according to a wireless communication network.

The link server 320 comprises a wireless communication module TWLU 510 ("Terminal Wireless LAN Unit" according to English terminology) capable of communicating, for example, according to the WIFI a/b/g or WImax standards, and a mobile telephony module 515 such as a GSM/GPRS or UMTS module, these two modules being connected to a triplexer module 520 connected to an antenna 525.

On the mobile telephony module 515, there is installed an operating system 530, on which there is present a router 535 capable of routing the communication either to the wireless communication module TWLU 510 or to the triplexer module 520 directly so as to use the mobile telephony protocol.

The communication of the server of the airplane with the server of the airline company is managed by a module VPN 540.

Furthermore, a fireguard ("firewall" according to English terminology) module 545 is installed upstream from the module VPN 540, between the data originating from the network server ANSU 315 and the module VPN 540 so as to protect the server 315 from intrusions.

Figure 6:
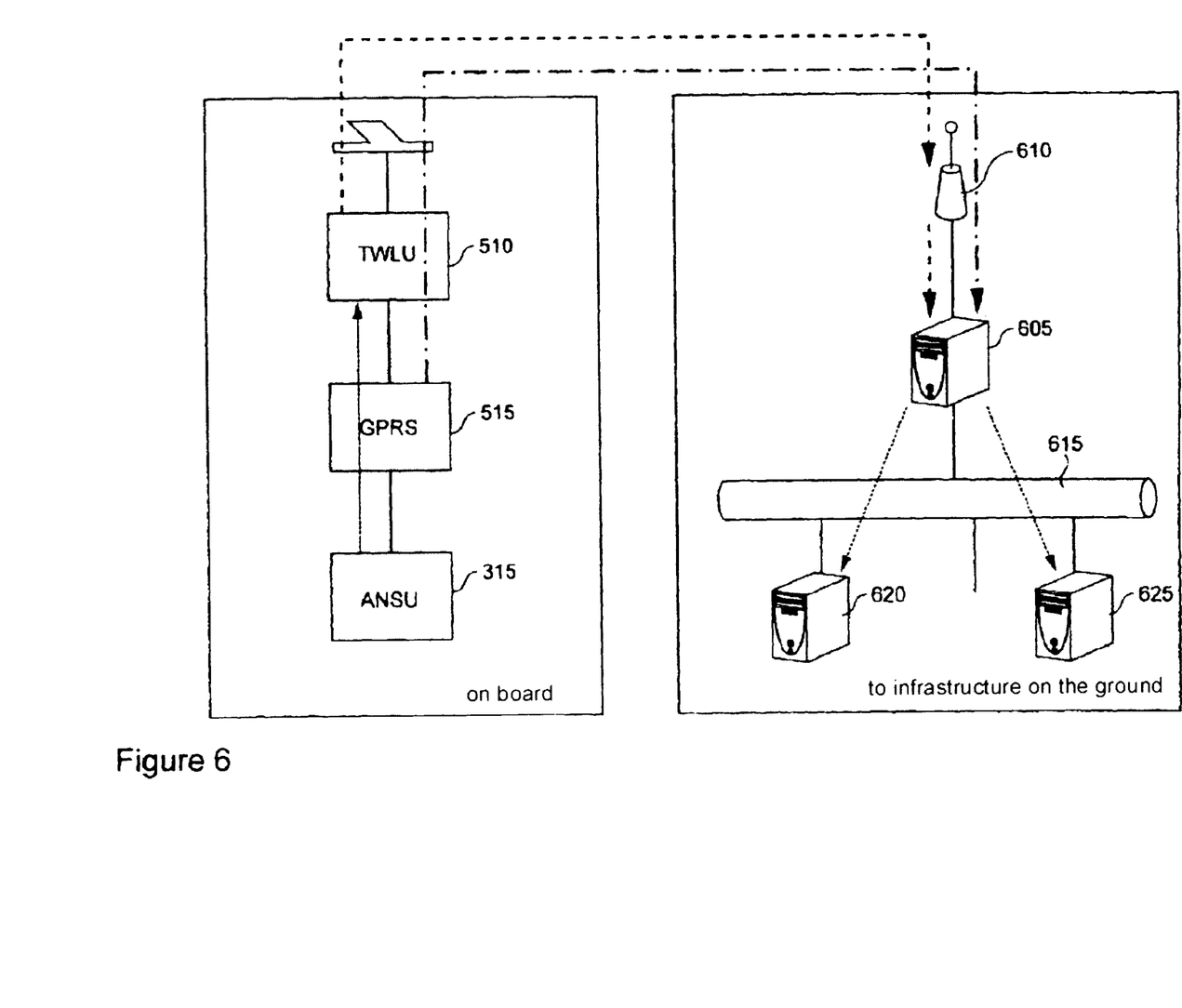
FIG. 6 illustrates an embodiment of the establishment of a virtual private network according to the invention.

FIG. 6 illustrates a method of establishing communication between a computer network forming at least in part the on-board infrastructure of an airplane and the computer network forming at least in part the airline company infrastructure on the ground, in accordance with the invention, based on the architecture shown in FIG. 5 comprising a wireless communication and a mobile telephony communication.

Within the airplane, such as seen above, a server ANSU 315 and a link server 320 comprising, according to the example, a wireless communication module TWLU 510 and a mobile telephony module 515, are present in the airplane.

Concerning the airline company network with which the server 310 of the airplane will communicate, this comprises a serveur proxy 605 (French translation of "proxy server", also called "agent server") of RADIUS ("Remote Authentication Dial-In User Service" according to English terminology) type, capable of receiving and sending out requests and data via an antenna 610.

The proxy server is a machine serving as intermediary between the computers of a local network of the airline company and a second network, the computer network of the airplane.

The proxy server 605 is connected via a local network 615 to other RADIUS servers 620, 625. In fact, it is to be noted that the RADIUS server can function as a proxy, that is, transmit requests from the client to other RADIUS servers.

A RADIUS server makes it possible to produce the link between identification needs and a user base ensuring transport of the authentication data in standardized manner.

In order to carry out data exchanges between the server of the airplane and the local network of the airline company, the server ANSU 315 generates an airplane certificate and transmits it to the wireless communication module 510 via the mobile telephony module 515 such as seen above.

The wireless communication module 510 sends out a request to the local network of the airline company according to the EAP-TLS ("Extensible Authentication Protocol-Transport Layer Security" according to English terminology) protocol, in order to exchange certificates and in this way create a secured tunnel between the network of the airplane and the local network of the airline company. This network created in this way is a virtual private network.

To do so, the EAP-TLS protocol uses two certificates for the creation of a secured tunnel which then allows identification: a server side and a client side.

This protocol uses an infrastructure with public keys ("Public Key Infrastructure" in English terminology) in order to secure the identification communications between the clients, namely the servers of the airplanes of the airline company and the RADIUS servers of the airline company.

The identification then is carried out, in particular by the sending out of a DHCP-type ("Dynamic Host Configuration Protocol" according to English terminology) request, to the proxy server of the local network of the airline company 305 in order to inform it of the identity thereof.

Figure 7:
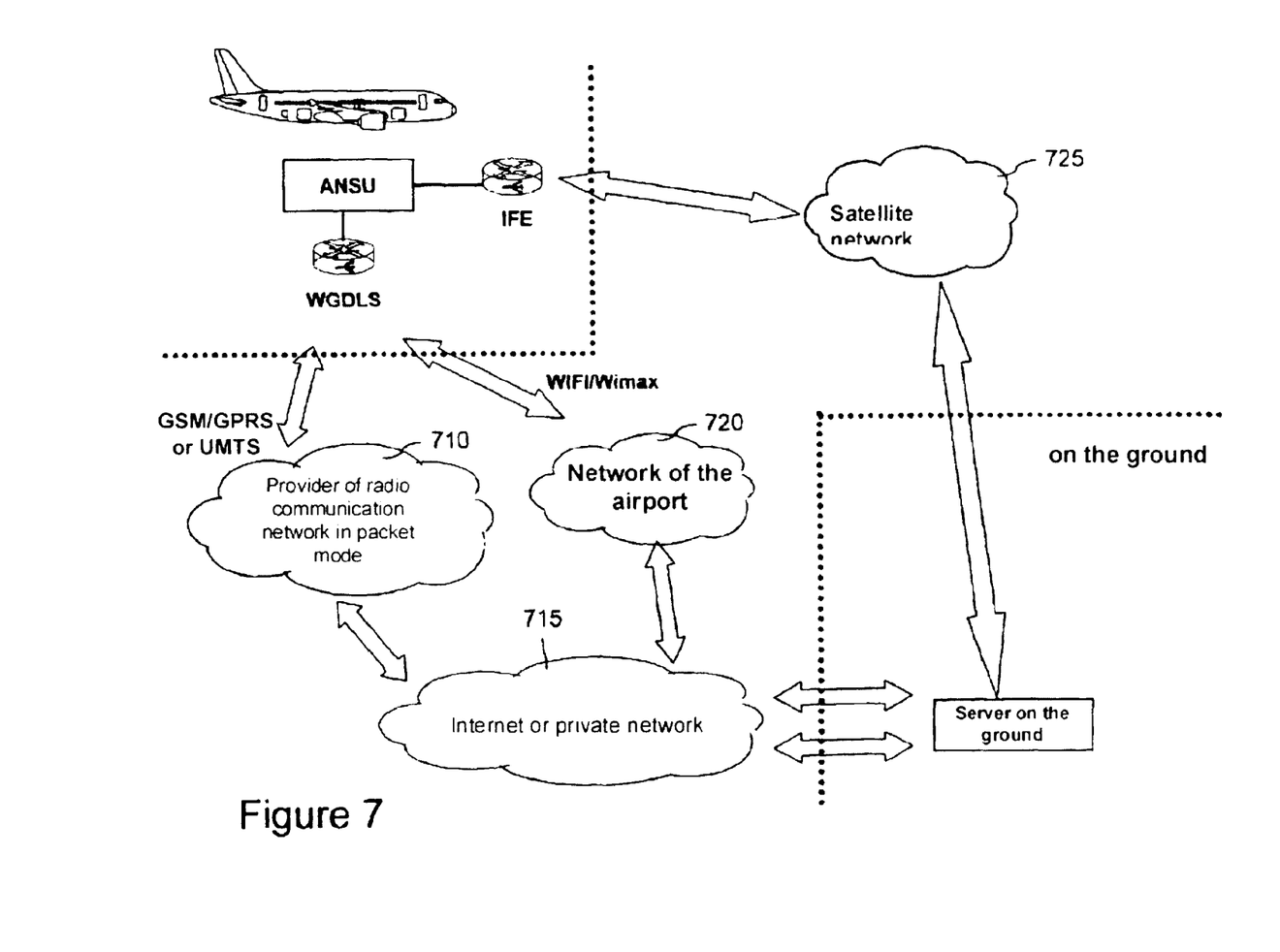
FIG. 7 illustrates different virtual private networks between a server of an airplane and a server on the ground in accordance with the invention.

FIG. 7 illustrates different virtual private networks capable of being created between the computer network of an airplane and the computer network on the ground, in particular the network of the airline company.

According to this Figure, there is illustrated the creation of a virtual private network based on a mobile telephony communication medium, namely the GSM/GPRS or UMTS network. Any type of mobile telephony network, however, can be used as a communication medium with a virtual private network according to the invention.

This type of virtual private network allowing communication of a computer network of an airplane with a network on the ground is achieved in particular via a provider of a radio communication network in packet mode 710 and the Internet network or a local private network 715.

Furthermore, there is illustrated the creation of a virtual private network based on a wireless communication medium 720, namely, for example, the WIFI or WImax network, the latter being in particular the network of the airport. This virtual private network also is achieved via the Internet network or a local private network 715.

Moreover, a virtual private network can be created between a computer network of an airplane and a network on the ground when the airplane is in flight, in particular by using a satellite communication 725.

Once this virtual private network exists, operations of maintenance, of loading, can be performed by a technician on board or on the ground and benefit from the most recent versions of the procedures manuals stored in the infrastructure on the ground.

Furthermore, it is possible to update the tools and data stores by the computers of the airplane in secured manner.

The invention claimed is:

1. An aircraft communication system installed in an aircraft, the system comprising:
   a network installed in the aircraft;
   a processor installed in the aircraft and configured to perform interactive browsing of maintenance data stored in a network on the ground and to execute a shared aircraft maintenance tool shared with the network on the ground; and
   a controller establishing a network connection between the network on the ground and the network in the aircraft via at least one communication medium according to a synchronous communication mode,
   wherein the processor is configured to execute the shared aircraft maintenance tool to perform, under the control of an operator on the ground, tests on an avionics system of the aircraft to diagnose and isolate a fault associated with a fault indication to a potentially defective replaceable entity on the aircraft,
   wherein the shared aircraft maintenance tool performs a maintenance action on the aircraft under the control of the operator on the ground based on a received wirelessly transmitted command from the operator on the ground via the network connection,
   wherein the maintenance action, performed by the shared aircraft maintenance tool executing on the processor installed in the aircraft, under the control of the operator on the ground, includes determining whether the fault indication is spurious without the operator being on board the aircraft, and
   wherein the maintenance action, when the fault indication is determined not to be spurious, identifies procedures to repair the fault and performs the repair of the fault on the aircraft based on wirelessly transmitted commands from the operator on the ground without the operator being on board the aircraft.

2. The system according to claim 1, further comprising means for synchronizing maintenance data stored in the network of the aircraft and the maintenance data stored in the network on the ground in a single sequence of operations coordinated in real time.

3. The system according to claim 1, wherein the at least one communication medium includes a mobile telephony network.

4. The system according to claim 1, wherein the at least one communication medium includes a wireless communication network.

5. The system according to claim 1, wherein the at least one communication medium includes at least two communication media, one of the at least two communication media including a hard-wired link.

6. The system according to claim 1, wherein the network in the aircraft and the network on the ground are connected by a virtual private network.

7. The system according to claim 1, wherein the controller establishes the network connection via the at least one communication medium according to a real-time synchronous communication mode.

8. The system according to claim 1, wherein the maintenance action on the aircraft is performed while the aircraft is in flight, under the control of the operator on the ground at a fixed location.

9. The system according to claim 1, wherein the controller is further configured to establish the network connection via the synchronous communication mode including a continuous and dedicated real time link for communication between the network on the ground and the network in the aircraft.

10. The system according to claim 1, wherein the processor is further configured to receive the shared aircraft maintenance tool from the network on the ground via the network connection.

11. The system according to claim 1, wherein maintenance data stored in the network installed in the aircraft is updated simultaneously with the maintenance data stored in the network on the ground to indicate the status of the potentially defective replaceable entity as operational.

12. The system according to claim 1, wherein the maintenance action is performed based on a most recent version of a maintenance procedure manual electronically stored in the network on the ground.

13. The system according to claim 1, wherein, when the fault indication is determined to be spurious, a status of the potentially defective replaceable entity is indicated to be operational based on a received signal from the operator on the ground via the network connection.

14. An aircraft communication system comprising, in an aircraft:
 a network installed in the aircraft;
 a processor installed in the aircraft and configured to perform interactive browsing of maintenance data stored in a network on the ground and to execute a shared aircraft maintenance tool shared with the network on the ground; and
 a controller establishing a network connection between the network on the ground and the network in the aircraft via at least one communication medium according to a synchronous communication mode,
 wherein the processor is configured to execute the shared aircraft maintenance tool to perform, under the control of an operator on the ground, tests on an avionics system of the aircraft to diagnose and isolate a fault associated with a fault indication to a potentially defective replaceable entity on the aircraft,
 wherein the shared aircraft maintenance tool performs a maintenance action on the aircraft under the control of the operator on the ground based on a received command from the operator via the network connection, and
 wherein the maintenance action, performed by the shared aircraft maintenance tool executing on the processor installed in the aircraft under the control of the operator on the ground, includes:
 determining whether the fault indication is spurious, where, when the fault indication is determined not to be spurious, the system identifies procedures to repair the fault and repairs the fault on the aircraft based on commands from the operator on the ground, and
 updating, using the processor installed on the aircraft, a maintenance logbook on the aircraft under the control of the operator on the ground regarding the performed maintenance action.

15. The system according to claim 14, wherein maintenance data stored in the network installed in the aircraft is updated simultaneously with the maintenance data stored in the network on the ground to indicate the status of the potentially defective replaceable entity as operational.

16. The system according to claim 14, wherein the maintenance action is performed based on a most recent version of a maintenance procedure manual electronically stored in the network on the ground.

17. The system according to claim 14, wherein, when the fault indication is determined to be spurious, a status of the potentially defective replaceable entity is indicated to be operational based on a received signal from the operator on the ground via the network connection.

18. An aircraft communication system installed in an aircraft, the system comprising:
 a network installed in the aircraft;
 a processor installed in the aircraft and configured to perform interactive navigation of data stored in a network on the ground and to execute a shared aircraft maintenance tool; and
 a controller establishing a network connection between the network on the ground and the network in the aircraft via at least one communication medium according to a synchronous communication mode,
 wherein the processor is configured to execute the shared aircraft maintenance tool to perform, under the control of an operator on the ground, tests on an avionics system of the aircraft to diagnose and isolate a fault associated with a fault indication to a potentially defective replaceable entity on the aircraft,
 wherein the shared aircraft maintenance tool performs a maintenance action on the aircraft under the control of the operator on the ground based on a received command from the operator via the network connection,
 wherein the network installed in the aircraft is configured to communicate with the network on the ground to create a continuity between the network in the aircraft and the network on the ground, the synchronous communication mode allowing for the interactive navigation in data stored in the network on the ground, and an operator in the aircraft being able to consult the data stored in the network on the ground,
 wherein the system further comprises means for updating data stored in the network installed in the aircraft from said data stored in the network on the ground, and
 wherein said system is configured to determine whether the fault indication is spurious, where, when the fault indication is determined not to be spurious, the system identifies procedures to repair the fault and repairs the fault on the aircraft based on commands from the operator on the ground.

19. The system according to claim 18, wherein data stored in the network installed in the aircraft is updated simultaneously with the data stored in the network on the ground to indicate the status of the potentially defective replaceable entity as operational.

20. The system according to claim 18, wherein, when the fault indication is determined to be spurious, a status of the potentially defective replaceable entity is indicated to be operational based on a received signal from the operator on the ground via the network connection.

* * * * *